United States Patent
Liang et al.

(10) Patent No.: US 7,287,863 B2
(45) Date of Patent: Oct. 30, 2007

(54) LIGHT TUNNEL WITH GRADIENT FILTER LAYER

(75) Inventors: Nai-Yueh Liang, Taipei (TW); Shu-Ching Chan, Pingtung (TW); Wei-Chung Wang, Taipei County (TW); Chong-Han Tsai, Taipei County (TW); Ta-Kun Kung, Taipei County (TW); Yen-Chun Chou, Taipei County (TW)

(73) Assignee: Prodisc Technology Inc., Taipei Hsien (TW)

( * ) Notice: Subject to any disclaimer, the term of this patent is extended or adjusted under 35 U.S.C. 154(b) by 293 days.

(21) Appl. No.: 11/110,751

(22) Filed: Apr. 21, 2005

(65) Prior Publication Data

US 2006/0109425 A1 May 25, 2006

(30) Foreign Application Priority Data

Nov. 24, 2004 (TW) .............................. 93136213 A

(51) Int. Cl.
*G03B 21/14* (2006.01)
*G03B 21/28* (2006.01)
*G03B 21/00* (2006.01)
*G03B 17/00* (2006.01)
*G01D 11/28* (2006.01)
*F21V 7/04* (2006.01)
*G02B 5/00* (2006.01)
*G02B 5/08* (2006.01)
*G02B 6/00* (2006.01)

(52) U.S. Cl. .................... 353/84; 353/122; 353/99; 353/37; 362/26; 362/551; 396/267; 359/894; 359/850; 385/133

(58) Field of Classification Search .............. 353/122, 353/99, 37, 84; 362/26, 551; 396/267; 359/894, 359/850; 385/131–133, 146–147

See application file for complete search history.

(56) References Cited

U.S. PATENT DOCUMENTS

| | | | | |
|---|---|---|---|---|
| 5,625,738 A | * | 4/1997 | Magarill | 385/146 |
| 5,947,577 A | * | 9/1999 | Jikihara et al. | 353/97 |
| 6,139,156 A | * | 10/2000 | Okamori et al. | 353/98 |
| 6,856,727 B2 | * | 2/2005 | Li | 385/31 |
| 7,029,130 B2 | * | 4/2006 | Cannon et al. | 353/97 |
| 7,090,357 B2 | * | 8/2006 | Magarill et al. | 353/94 |
| 2005/0012903 A1 | * | 1/2005 | Drazic et al. | 353/30 |

* cited by examiner

*Primary Examiner*—Diane Lee
*Assistant Examiner*—Magda Cruz
(74) *Attorney, Agent, or Firm*—Birch, Stewart, Kolasch & Birch, LLP

(57) ABSTRACT

A light tunnel with a gradient filter layer includes a light tunnel body and a gradient filter layer. In this case, the gradient filter layer is disposed at a light emerging side. The transmission rate at the central area of the gradient filter layer is smaller than the transmission rate at the edge area of the gradient filter layer.

16 Claims, 4 Drawing Sheets

LIGHT TUNNEL WITH GRADIENT FILTER LAYER

BACKGROUND OF THE INVENTION

1. Field of Invention

The invention relates to a light tunnel and, in particular, to a light tunnel with a gradient filter layer.

2. Related Art

Image projection system is one of the most popular products in the optoelectronic industry. The most known technologies include the cathode ray tube (CRT) technology, the digital light processing (DLP) technology, the reflective liquid crystal technology, the transmissive liquid crystal technology, and the likes. Herein, the DLP and reflective liquid crystal technologies both utilize a light tunnel for improving the luminance uniformity.

Hereinafter, a DLP is taken as an example for illustrating the function of the light tunnel in the DLP.

The DLP is digitally controlled and is operated with utilizing the light-reflecting principle. The light beam is firstly generated from a light source and then focused with a lens. After that, the light beam passes through a color filter such as including a red filter, a green filter and a blue filter. Next, the light beam achieves a digital micro-mirror device (DMD). The DMD includes a plurality of movable micro-mirrors and driving electrodes for controlling the tilt angle and rotating time of the micro-mirrors. After being reflected with the DMD, the light beam can be projected on a screen through a projection lens for generating an image.

With reference to FIG. 1, in a DLP 10, a light source 11 emits a light beam, which then passes through an UV/IR cut filter 12 and color wheel 13. After that, the light beam passes through a light tunnel 14 and a lens 15, and then reaches the reflective mirror 16. The reflective mirror 16 reflects the light beam to the DMD 17 obliquely. After processed with the DMD 17, the light beam goes to a projection lens 18 so as to be projected on a screen 19 for generating the image.

The light tunnel 14 is used to guide the light beam (e.g. to change the progressing direction of the light beam) and to collimate the light beam. In addition, the light tunnel 14 can improve the luminance uniformity and control the aspect ratio of the projected light. The light tunnel 14 is also known as a light rod, an integration rod, a light pipe or a rod lens.

Since the light beam is reflected to the DMD 17 obliquely, the paths of different parts of the reflected light beam from the reflective mirror 16 to the DMD 17 are not equivalent. Thus, the light beam may not be focused on the DMD 17, causing that the area of the light beam reaching one surface of the DMD 17 is increased. As a result, the light reaching the surface of the DMD 17 has reduced brightness and lower luminance uniformity.

In the conventional DLP 10, the DMD 17 includes a control circuit 171 for controlling the tilt angle of each DMD 17 to generate gray-scaled images according the red, blue and green gray signals of the video signals.

However, to generate image with uniform luminance, the control circuit 171 of the DMD 17 must process a pre-compensation of the light beam. This will reduce the gray level that the DMD 17 can provide, so as to affect the final image quality.

It is therefore an important subjective of the invention to provide a light tunnel with a gradient filter layer for the problem of reduced gray level caused by the pre-compensation process.

SUMMARY OF THE INVENTION

In view of the foregoing, the invention is to provide a light tunnel with a gradient filter layer, which can improve the luminance uniformity of images.

To achieve the above, a light tunnel of the invention includes a light tunnel body and a gradient filter layer. In the invention, the gradient filter layer is disposed at a light emerging side of the light tunnel body. A transmission rate at a central area of the gradient filter layer is smaller than a transmission rate at an edge area of the gradient filter layer.

As mentioned above, the light tunnel with a gradient filter layer of the invention can generate a light beam with non-uniform luminance. Comparing to the prior art, the gradient filter layer, which has the transmission rate at the central area smaller than the transmission rate at the edge area, can cause the light beam with non-uniform luminance. When the light tunnel of the invention is applied in a DLP system, the previously described problem of non-uniform luminance, which has higher luminance at the center and lower luminance in the edges, caused by the different paths of projected light can be improved, so as to enhance the product quality.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
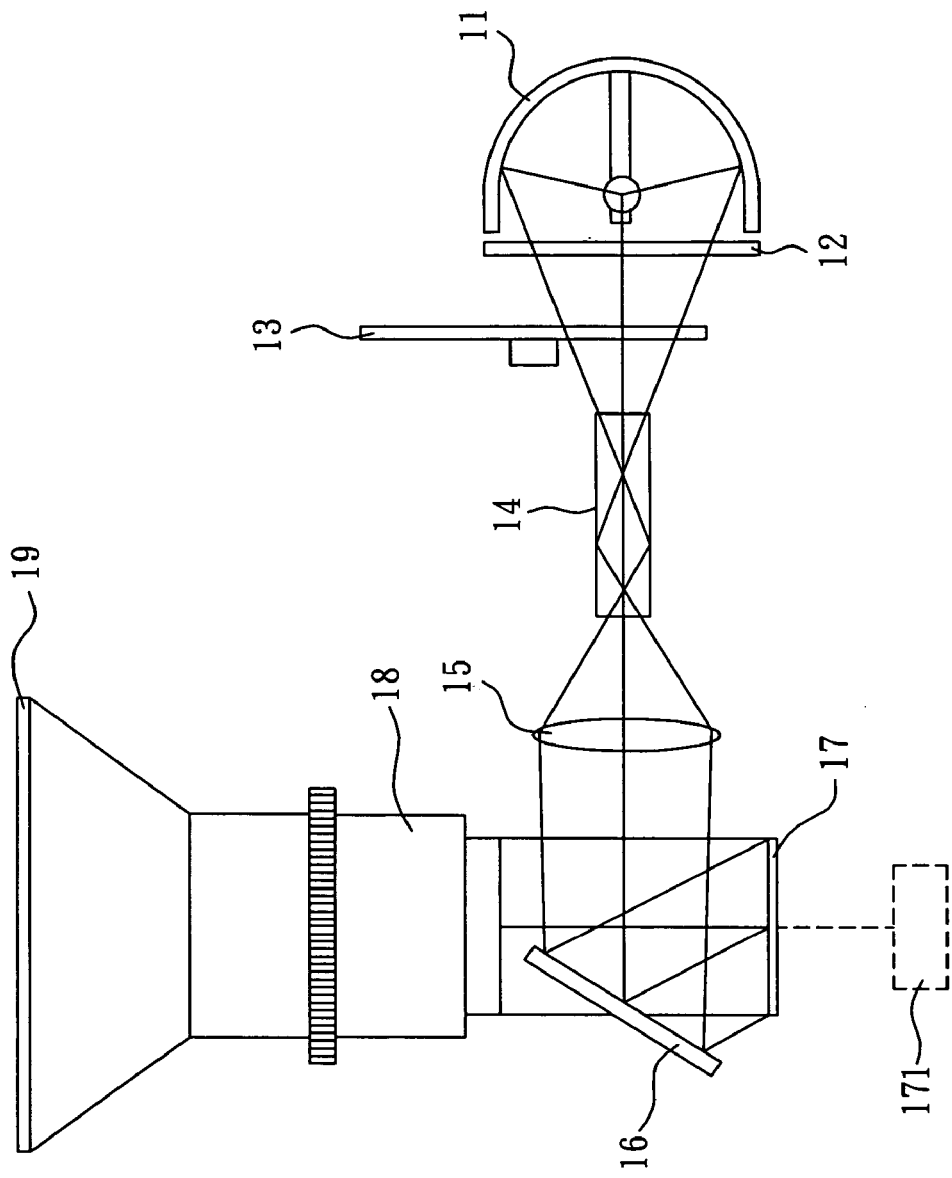
FIG. 1 is a schematic view showing a conventional DLP.
Figure 2:
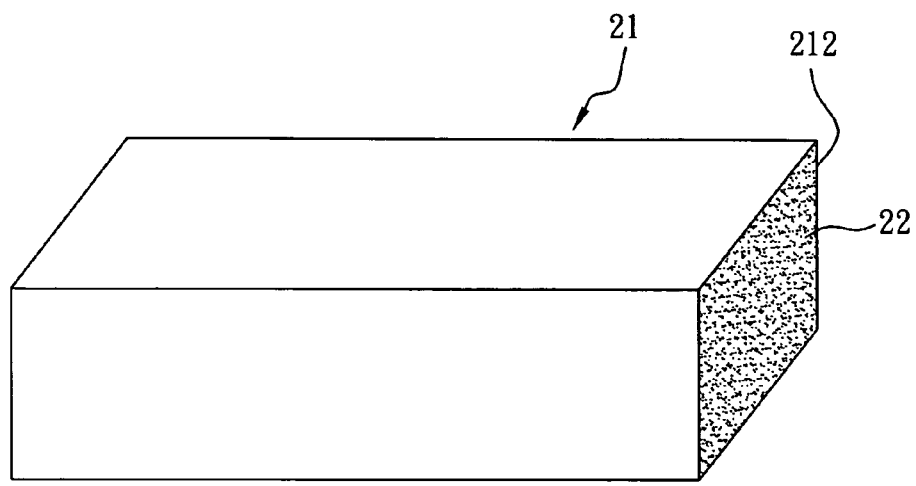
FIG. 2 is a schematic view showing a light tunnel with a gradient filter layer according to a preferred embodiment of the invention.

With reference to FIG. 2, a light tunnel 20 according to a preferred embodiment of the invention includes a light tunnel body 21 and a gradient filter layer 22.

In this embodiment, the light tunnel body 21 is a solid rod, such as a glass solid rod. The light tunnel body 21 utilizes the total reflection phenomenon to guide and collimate light. Of course, the outer surface of the light tunnel body 21 may has a high-reflective layer. Thus, the light incident into the light tunnel body 21 can be guided and outputted from a light emerging side 212. Accordingly, the light tunnel body 21 can guide and collimate the light.

Figure 3:
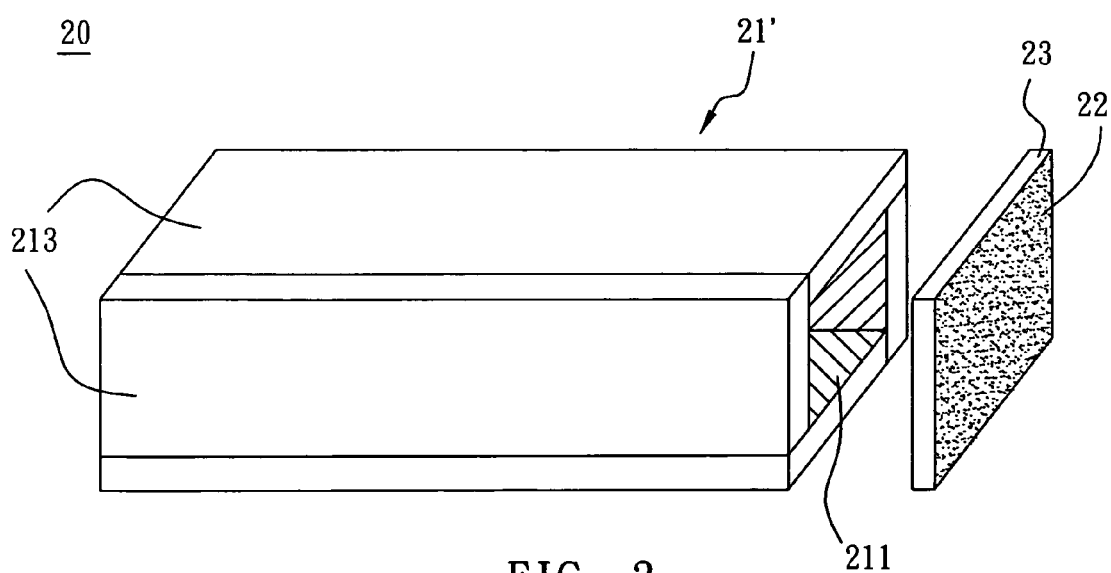
FIG. 3 is a schematic view showing another light tunnel with a gradient filter layer according to a preferred embodiment of the invention.

With reference to FIG. 3, the light tunnel body, such as the light tunnel body 21', can be composed of a plurality of mirrors 213. In this case, the light tunnel body 21' is a hollow tunnel. The inner surfaces of the light tunnel body 21', which are the surfaces of the mirrors 213 facing to the tunnel for light passing, may has a high-reflective layer 211. In the current embodiment, the high-reflective layer 211 can be a mirror for causing total reflection of the light beams incident into the light tunnel body 21'. Accordingly, the light tunnel body 21' can guide and collimate the light.

Figure 4:
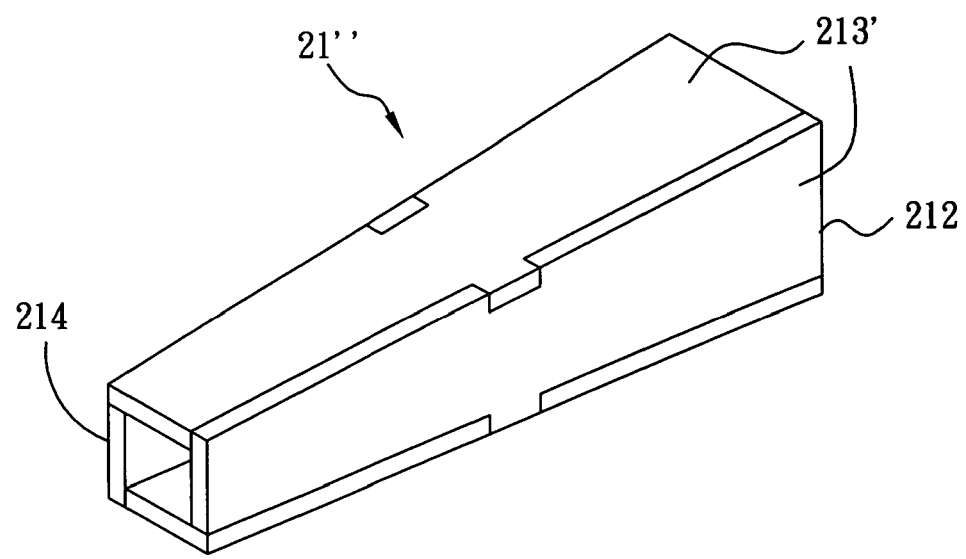
FIG. 4 is a schematic view showing still another light tunnel with a gradient filter layer according to a preferred embodiment of the invention.

In addition, according to the assembling angle of the mirrors 214 or the outer shape of the solid rod, the different cross-sections of the light tunnel body 21 or 21' perpendicular to the light passing direction may have equivalent or non-equivalent diagonal lines. Thus, the different cross-sections of the light tunnel body 21 or 21' can be in different shapes such as a rectangular, a trapezoid (as shown in FIG. 4), a parallelogram or other polygons. In the present embodiment, the cross-section of the light tunnel body 21 or 21' is rectangular.

As shown in FIG. 4, a light tunnel body 21" is composed of several trapezoid mirrors 213' and has a light incident side 214 opposite to the light emerging side 212. The cross-section close to the light emerging side 212 and the cross-section close to the light incident side 214 have different areas. Of course, as shown in FIGS. 2 and 3, the cross-section close to the light emerging side 212 and the cross-section close to the light incident side 214 may have equivalent areas.

With reference to FIG. 2, the gradient filter layer 22 is disposed at the light emerging side 212 of the light tunnel body 21. Regarding to the light tunnel body 21 that is a solid rod, the gradient filter layer 22 can be directly coated on the light tunnel body 21. The gradient filter layer 22 can be a metal reflective layer, which is made of, for example, chromium, silver. In addition, the gradient filter layer 22 can be made of a dielectric material. By different thicknesses or densities, the transmission rate at the central area of the gradient filter layer 22 is smaller than the transmission rate at the edge area of the gradient filter layer 22. In other words, the edge area of the gradient filter layer 22 has higher transmission rate.

Figure 5:
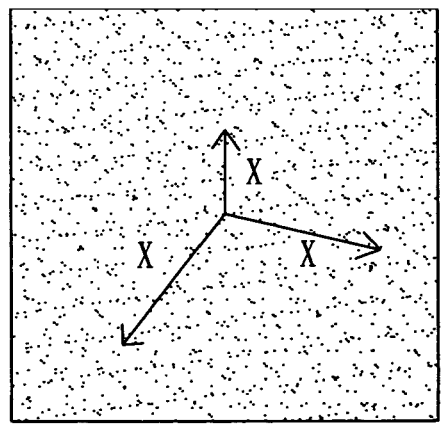
FIG. 5 is a schematic view showing a gradient filter layer according to a preferred embodiment of the invention, wherein X represents the distance between any point and the center of the gradient filter layer.
Figure 6:
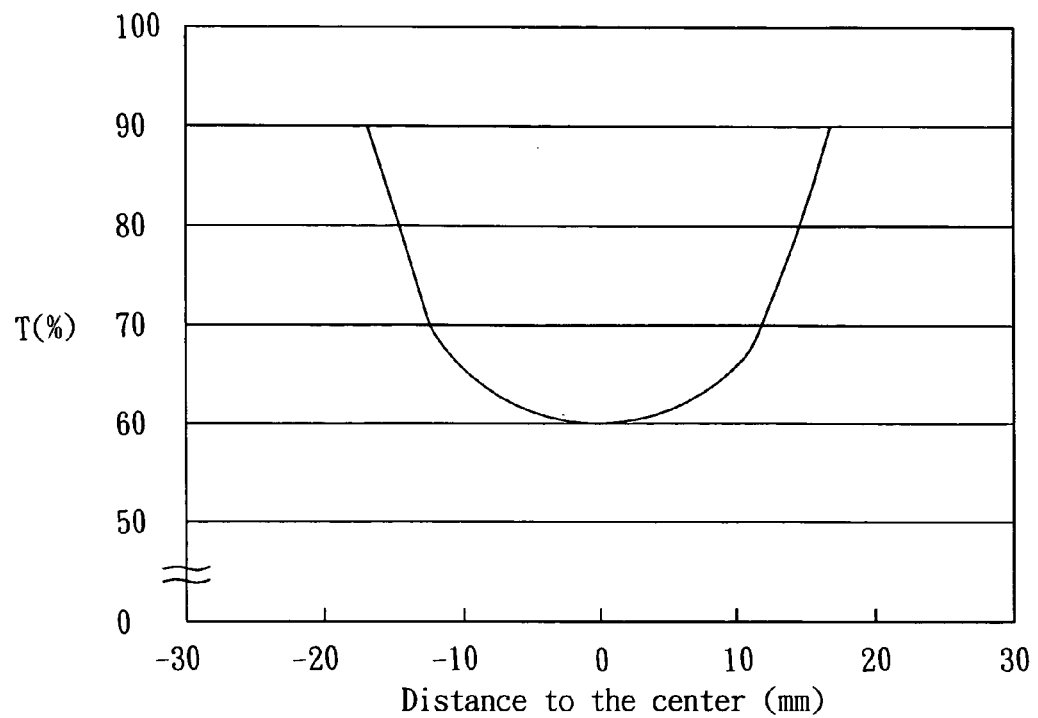
FIG. 6 is a schematic view showing the transmission rate of the gradient filter layer according to a preferred embodiment of the invention.

Referring to FIGS. 5 and 6, X represents the distance between any point and the center of the gradient filter layer 22, which is the horizontal axle shown in FIG. 6, and the vertical axle shown in FIG. 6 is the transmission rate (T %). As shown in FIG. 6, the central area and the edge area of the gradient filter layer 22 have different transmission rates. The transmission rate at the central area is lower, and the transmission rate at the edge area is higher. The higher transmission rate means the higher light flux; otherwise, the lower transmission rate means the lower light flux. The level of the transmission rate can be determined according to the actual products. Of course, the size of area of the gradient filter layer 22 can also be determined according to the actual products. In addition, the shape of the gradient filter layer 22 can be circular or polygon.

As shown in FIG. 3, the light tunnel 20 of the invention may further include a transparent substrate 23, on which the gradient filter layer 22 is disposed. The transparent substrate 23 is attached to the light emerging side 212 of the light tunnel body 21'. In this case, the gradient filter layer 22 and the transparent substrate 23 can construct a neutral density filter.

After passing through the light tunnel 20 with the gradient filter layer 22, the outputted light may have lower luminance at the central area and higher luminance at the edge area. Accordingly, the light with non-uniform luminance is generated for the DMD of the projection system so as to finally generate projection image with uniform luminance.

Figure 7:
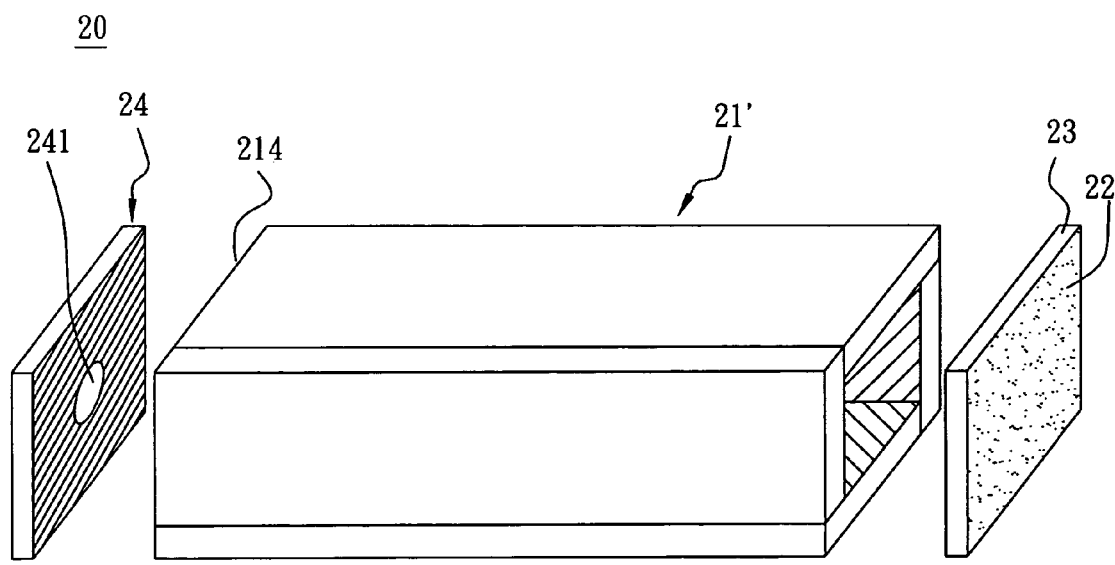
FIG. 7 is a schematic view showing yet another light tunnel with a gradient filter layer according to a preferred embodiment of the invention.

With reference to FIG. 7, the light tunnel 20 of the invention may further include a reflecting film 24, which is disposed at the light incident side 214 of the light tunnel body 21'. The reflecting film 24 has a transmission portion 241, which allows light going into the light tunnel body 21'. The transmission portion 241 may be located at the central area of the reflecting film 24. The reflecting film 24 has a reflecting layer for blocking light scattered or reflected from the light incident side 214 and reflecting the light back to the light tunnel body 21'. Thus, the light flux can be increased so as to compensate the image.

In summary, the light tunnel with a gradient filter layer of the invention can generate a light beam with non-uniform luminance. Comparing to the prior art, the gradient filter layer, which has the transmission rate at the central area smaller than the transmission rate at the edge area, can cause the light beam with non-uniform luminance. When the light tunnel of the invention is applied in a DLP system, the previously described problem of non-uniform luminance, which has higher luminance at the center and lower luminance in the edges, caused by the different paths of projected light can be improved, so as to enhance the product quality.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A light tunnel, comprising:
   a light tunnel body; and
   a gradient filter layer, which is disposed at a light emerging side of the light tunnel body, wherein a transmission rate at a central area of the gradient filter layer is smaller than a transmission rate at an edge area of the gradient filter layer.

2. The light tunnel of claim 1, wherein the light tunnel body is a solid rod.

3. The light tunnel of claim 1, wherein the light tunnel body is a solid rod and an outer surface of the light tunnel body is a high-reflective layer.

4. The light tunnel of claim 1, wherein a cross-section of the light tunnel body is rectangular.

5. The light tunnel of claim 1, wherein a cross-section of the light tunnel body has diagonal lines with different lengths.

6. The light tunnel of claim 1, wherein a cross-section of the light tunnel body is a trapezoid.

7. The light tunnel of claim 1, wherein the light tunnel body has a light incident side opposite to the light emerging side.

8. The light tunnel of claim 7, wherein a cross-section close to the light emerging side and a cross-section close to the light incident side have different areas.

9. The light tunnel of claim 7, wherein a cross-section close to the light emerging side and a cross-section close to the light incident side have equivalent areas.

10. The light tunnel of claim 7, further comprising:

a reflecting film, which is disposed at the light incident side of the light tunnel body and has a transmission portion.

11. The light tunnel of claim 1, wherein the gradient filter layer is coated on the light tunnel body.

12. The light tunnel of claim 1, wherein the gradient filter layer is made of chromium.

13. The light tunnel of claim 1, wherein the gradient filter layer is a reflective metal layer.

14. The light tunnel of claim 1, wherein the gradient filter layer is made of a dielectric material.

15. The light tunnel of claim 1, wherein the light tunnel body is composed of a plurality of mirrors, and an inner surface of the light tunnel body has a high-reflective layer.

16. The light tunnel of claim 15, further comprising:

a transparent substrate, wherein the gradient filter layer is disposed on the transparent substrate and the transparent substrate is attached to the light emerging side of the light tunnel body.

* * * * *